(12) United States Patent
Caenazzo et al.

(10) Patent No.: US 7,895,910 B2
(45) Date of Patent: Mar. 1, 2011

(54) GEARBOX WITH SIX OR MORE FORWARD GEARS FOR SINGLE-CLUTCH OR TWIN-CLUTCH MOTOR-VEHICLE TRANSMISSIONS

(75) Inventors: Dario Caenazzo, Orbassano (IT); Gianluigi Pregnolato, Orbassano (IT); Valter Pastorello, Orbassano (IT); Carlo Emilio Baret, Orbassano (IT)

(73) Assignee: C.R.F. Societa Consortile per Azioni, Orbassano (Torino) (IT)

( * ) Notice: Subject to any disclaimer, the term of this patent is extended or adjusted under 35 U.S.C. 154(b) by 581 days.

(21) Appl. No.: 11/949,269

(22) Filed: Dec. 3, 2007

(65) Prior Publication Data

US 2008/0127759 A1  Jun. 5, 2008

(30) Foreign Application Priority Data

Dec. 4, 2006  (EP) .................................. 06425814

(51) Int. Cl.
*F16H 3/08* (2006.01)
(52) U.S. Cl. .......................................... 74/331; 74/330
(58) Field of Classification Search .................. 74/330, 74/331
See application file for complete search history.

(56) References Cited

U.S. PATENT DOCUMENTS

| | | | |
|---|---|---|---|
| 4,033,200 A | | 7/1977 | Stockton |
| 5,743,141 A | * | 4/1998 | Forsyth ........................ 74/331 |
| 6,397,692 B1 | * | 6/2002 | Carriere ....................... 74/331 |
| 7,004,044 B2 | * | 2/2006 | Hosono ........................ 74/339 |
| 7,258,033 B2 | * | 8/2007 | Baldascini et al. ............ 74/331 |
| 7,263,907 B2 | * | 9/2007 | Stevenson .................... 74/340 |
| 7,437,963 B2 | * | 10/2008 | Haka et al. ................... 74/329 |
| 2005/0150318 A1 | | 7/2005 | Baldascini et al. |
| 2005/0241424 A1 | | 11/2005 | Baldascini et al. |
| 2006/0117882 A1 | * | 6/2006 | Gitt ............................. 74/340 |
| 2006/0185455 A1 | | 8/2006 | Sander |
| 2008/0047378 A1 | * | 2/2008 | Borgerson et al. ............ 74/331 |

FOREIGN PATENT DOCUMENTS

DE   196 24 857 A1   1/1997

(Continued)

*Primary Examiner*—Tisha D Lewis
(74) *Attorney, Agent, or Firm*—Sughrue Mion, PLLC

(57) ABSTRACT

The gearbox comprises a pair of coaxial input shafts, that is, an inner input shaft and an outer input shaft, a first, upper output shaft, a second, lower output shaft, and an intermediate shaft. A driven gearwheel for a fourth gear and a driven gearwheel for a reverse gear are idly mounted on the opposite ends of the upper output shaft, the driven gearwheel meshing with an intermediate gearwheel idly mounted on the intermediate shaft. A driven gearwheel for a sixth gear and a driven gearwheel for a first gear are idly mounted on opposite ends of the lower output shaft. A first driving gearwheel is drivingly connected for rotation with the outer input shaft at an end thereof and meshes both with the driven gearwheel for the fourth gear and with the third driven gearwheel for the sixth gear. A second driving gearwheel meshing with the driven gearwheel for the first gear and a third driving gearwheel meshing with the intermediate gearwheel are drivingly connected for rotation with the inner input shaft at the opposite end thereof. The third driving gearwheel, the driven gearwheel for the reverse gear and the intermediate gearwheel are straight gearwheels.

13 Claims, 5 Drawing Sheets

FOREIGN PATENT DOCUMENTS

| | | |
|---|---|---|
| DE | 103 26 866 A1 | 12/2004 |
| DE | 10 2004 012 909 A1 | 10/2005 |
| EP | 1245863 A2 * | 10/2002 |
| EP | 1 544 505 A1 | 6/2005 |
| EP | 1 589 257 A | 10/2005 |
| FR | 2 846 064 A1 | 4/2004 |

* cited by examiner

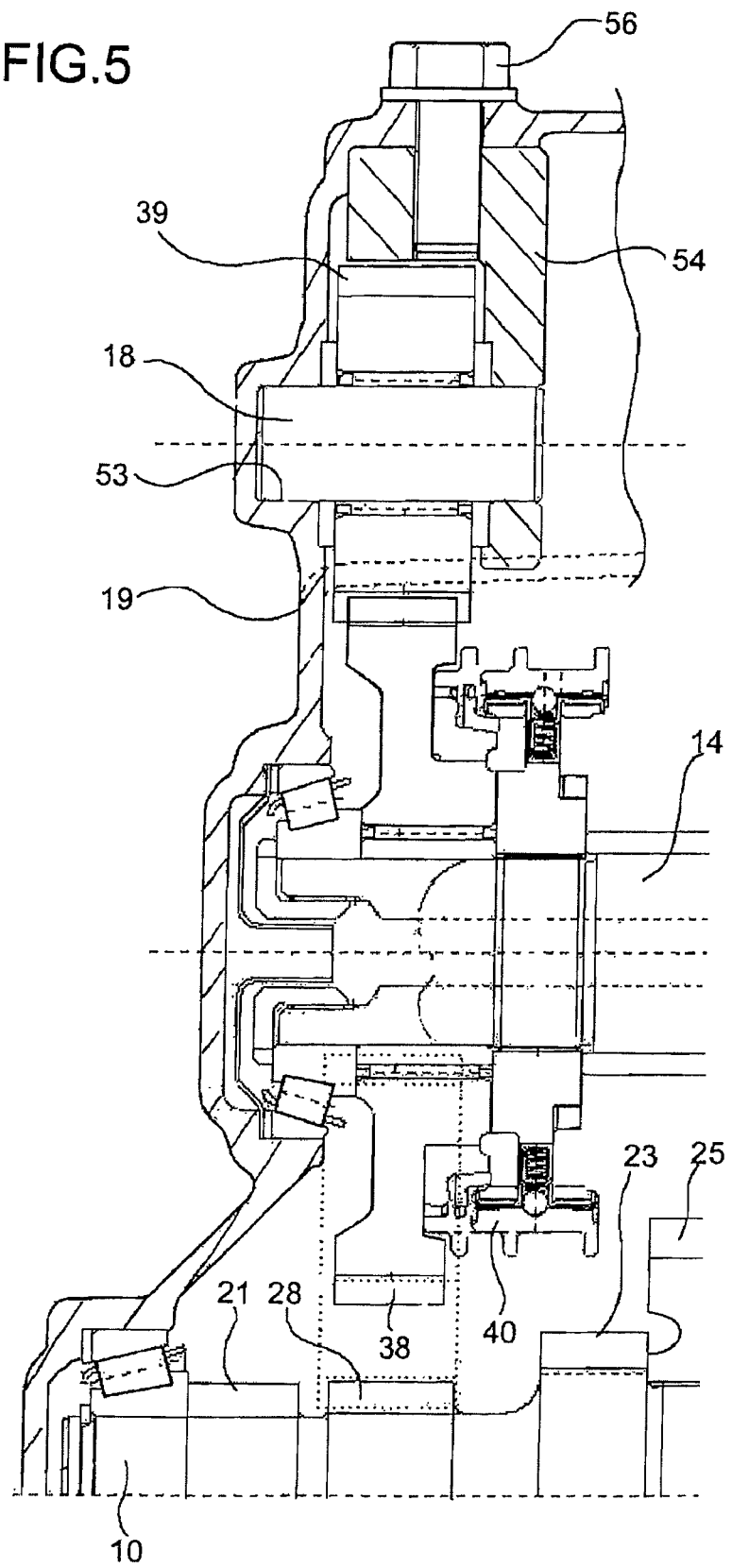

GEARBOX WITH SIX OR MORE FORWARD GEARS FOR SINGLE-CLUTCH OR TWIN-CLUTCH MOTOR-VEHICLE TRANSMISSIONS

BACKGROUND OF THE INVENTION

The present invention relates to a gearbox with six or more forward gears for single-clutch or twin-clutch motor-vehicle transmissions.

A six-gear gearbox of the type specified above is known from European patent application EP-A-1589257 in the Applicant's name. This known gearbox comprises:

a pair of coaxial input shafts, that is, an inner input shaft and an outer input shaft, each of which can be coupled for rotation with a drive shaft by means of a respective clutch, a pair of output shafts, that is, an upper output shaft and a lower output shaft, which are parallel to the input shafts and are disposed above and below those shafts, respectively, a first set of driving gearwheels associated with the odd gears (first, third and fifth) and with the reverse gear and carried by the inner input shaft, a second set of driving gearwheels associated with the even gears (second, fourth and sixth) and carried by the outer input shaft, a first set of driven gearwheels associated with the second, fourth and reverse gears, which gearwheels are idly mounted on the upper output shaft and can be coupled selectively for rotation with that shaft by means of sliding engagement sleeves, and a second set of driven gearwheels associated with the first, third, fifth and sixth gears, which gearwheels are idly mounted on the lower output shaft and can be coupled selectively for rotation with that shaft by means of sliding engagement sleeves.

More specifically, to limit the overall axial length of the transmission, in the gearbox that is known from the above-mentioned patent application, a driving gearwheels which is common to the first and reverse gears is provided on the inner input shaft and a driving gearwheel which is common to the fourth and sixth gears is provided on the outer input shaft. These two shared driving gearwheels are disposed at opposite ends of the gearbox. Moreover, the driven gearwheel for the first gear that is idly mounted on the lower output shaft is used as the idle gear of the reverse gear train.

A problem of the known gearbox described above is the considerable length of the upper output shaft which hinders a forward transverse arrangement of the gearbox, particularly with a twin-clutch transmission which itself leads to a greater axial length owing to the presence of a second clutch.

SUMMARY OF THE INVENTION

It is therefore an object of the present invention to provide a gearbox with six or more gears for single-clutch or twin-clutch motor-vehicle transmissions which has a shorter upper output shaft.

A further object of the present invention is to provide a gearbox with six or more gears for single-clutch or twin-clutch motor-vehicle transmissions having a design such as to ensure maximum synergy between the single-clutch and twin-clutch versions, that is, such that it is possible to change from one version to the other with the minimum number of modifications in terms of number, structure and arrangement of the components.

These and other objects are achieved in full according to the present invention by virtue of a gearbox having the characteristics specified in claim 1.

Advantageous embodiments of the invention are defined in the dependent claims.

As will become clear from the following description, a gearbox according to the invention enables the length of the upper output shaft to be limited, thus enabling the gearbox to be installed easily in a forward position and with a transverse orientation, even in the twin-clutch version. Moreover, a gearbox according to the invention enables the number of components that are common to the single-clutch version, be it manual or robotized, and to the corresponding twin-clutch version, to be maximized and the number of modifications that are required to change from one version to the other to be minimized. The single- and twin-clutch versions of the same gearbox can thus be manufactured in the same production line with clear advantages in terms of costs.

BRIEF DESCRIPTION OF THE DRAWINGS

Further characteristics and advantages of the invention will become clear from the following detailed description which is given purely by way of non-limiting example with reference to the appended drawings, in which:

FIG. 5 is an axial section view through the reverse gear train of a gearbox according to FIG. 1 or FIG. 4.

Figure 1:
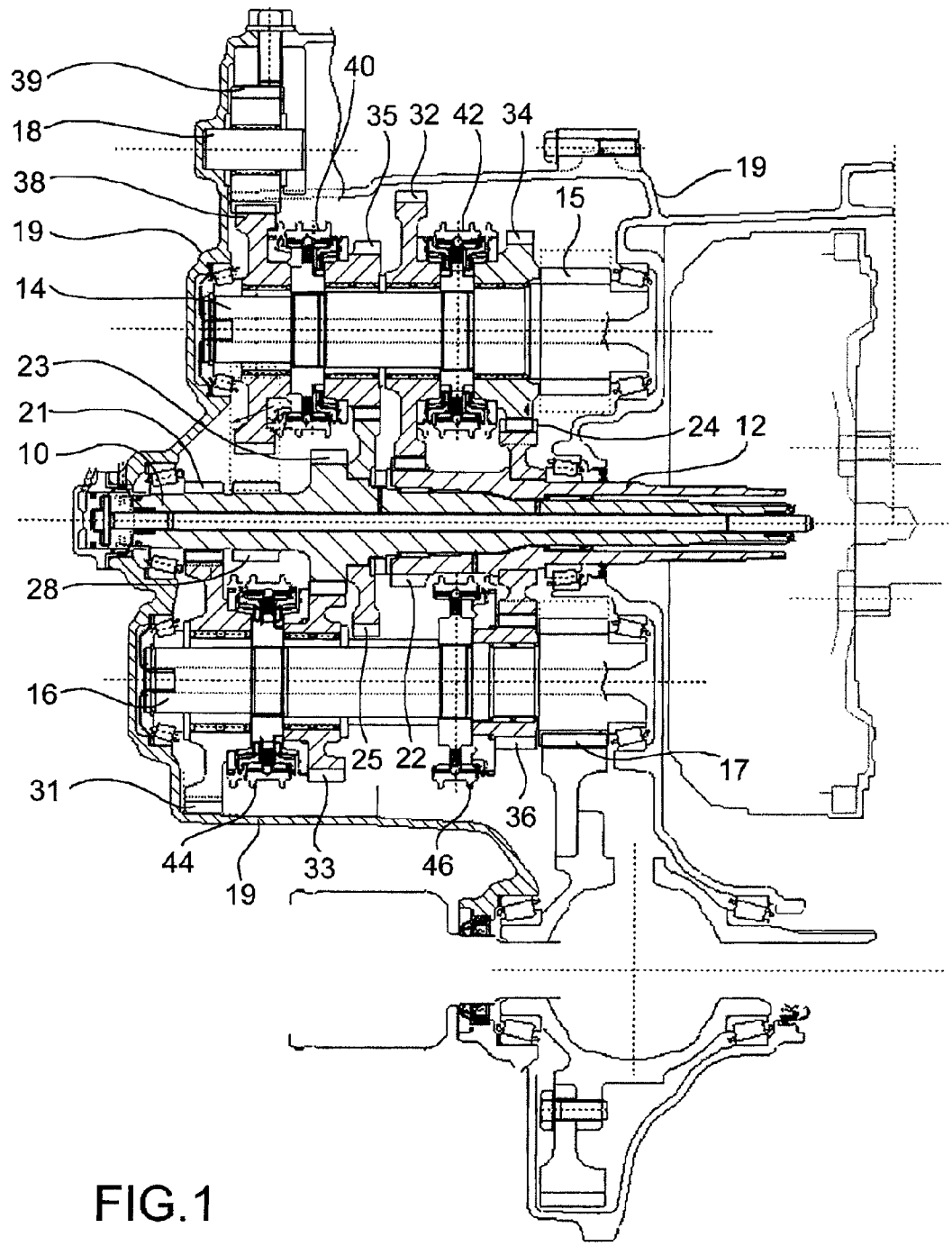
FIG. 1 is an axial section view through a six-gear gearbox for a twin-clutch motor-vehicle transmission according to a preferred embodiment of the present invention.

In the drawings, the gear trains corresponding to the various forward gears of the transmission are indicated by the Roman numerals I, II, III, IV, V and VI, for first, second, third, fourth, fifth and sixth gears, respectively, and the reverse gear train is indicated by the letter R.

DETAILED DESCRIPTION OF THE PREFERRED EMBODIMENTS

With reference initially to FIG. 1, a six-gear gearbox for a twin-clutch motor-vehicle transmission according to a preferred embodiment of the invention comprises:

a pair of coaxial input shafts, that is, an inner input shaft 10 and an outer input shaft 12, each of which can be coupled with a drive shaft (not shown) by means of a respective clutch (also not shown), an upper output shaft 14 which is parallel to and disposed at a higher level than the two input shafts 10 and 12, a lower output shaft 16 which is parallel to and disposed at a lower level than the two input shafts 10 and 12, an intermediate reverse-gear shaft 18 parallel to the two input shafts 10 and 12, and a housing 19 in which the two input shafts 10, 12 and the two output shafts 14, 16 are supported.

The outer input shaft 12 is formed as a hollow shaft which partially houses the inner input shaft 10. The inner input shaft 10 projects from the outer input shaft 12 at the end remote from that facing the clutches and hence the engine.

The inner input shaft 10 carries, in order from left to right as seen in FIG. 1, that is, towards the clutch unit, a driving gearwheel 21 for the first gear, a driving gearwheel 28 for the reverse gear, a driving gearwheel 23 for the third gear, and a driving gearwheel 25 for the fifth gear. The outer input shaft 12 carries, in order from left to right, a driving gearwheel 22 for the second gear and a driving gearwheel 24 for the fourth and sixth gears. The driving gearwheels 21, 22, 23, 24, 25 and 28 are drivingly connected for rotation with the respective input shafts 10 and 12 on which they are mounted and may either be produced integrally with the shafts or be formed as separate components from the shaft and fixed thereto by suitable mechanical fastening means.

The upper output shaft 14 carries, in order from left to right, a driven gearwheel 38 for the reverse gear, a driven gearwheel 35 for the fifth gear, a driven gearwheel 32 for the second gear, a driven gearwheel 34 for the fourth gear and a final reduction pinion 15. The lower output shaft 16 carries, in order from left to right, a driven gearwheel 31 for the first gear, a driven gearwheel 33 for the third gear, a driven gearwheel 36 for the sixth gear, and a final reduction pinion 17.

The driven gearwheels 31, 32, 33, 34, 35, 36 and 38 are formed as freely rotatable gears and can be coupled selectively for rotation with the respective output shafts by means of sliding engagement sleeves 40, 42, 44 and 46. More specifically, a first engagement sleeve 40 is mounted on the upper output shaft 14 between the driven gearwheels 38 and 34 for the reverse gear and for the fifth gear, respectively, and is movable selectively to the left or to the right to couple the gearwheel 38 or the gearwheel 35, respectively, for rotation with the output shaft 14. A second engagement sleeve 42 is mounted on the upper output shaft 14 between the driven gearwheels 32 and 34 for the second and fourth gears, respectively, and is movable selectively to the left or to the right to couple the gearwheel 32 or the gearwheel 34, respectively, for rotation with the output shaft 14. A third engagement sleeve 44 is mounted on the lower output shaft 16 between the driven gearwheels 31 and 33 for the first and third gears, respectively, and is movable selectively to the left or to the right in order to couple the gearwheel 31 or the gearwheel 33, respectively, for rotation with the output shaft 16. A fourth engagement sleeve 46 is mounted on the lower output shaft 16 beside the driven gearwheel 36 for the sixth gear and is movable to the right in order to couple the gearwheel 36 for rotation with the output shaft 16.

The intermediate reverse-gear shaft 18 carries a freely rotatable gearwheel 39 meshing with the driven gearwheel 38 for the reverse gear carried by the upper output shaft 14.

Proceeding in order from left to right, the driving gearwheel 21 on the inner input shaft 10 meshes with the driven gearwheel 31 on the lower output shaft 16 to implement the first gear ratio (I). The driving gearwheel 28 on the inner input shaft 10 meshes with the freely rotatable gearwheel 39 on the intermediate, reverse-gear shaft 18 and rotates the driven gearwheel 38 on the upper output shaft 14 by means of the gearwheel 39 to implement the reverse gear (R). The driving gearwheel 23 on the inner input shaft 10 meshes with the driven gearwheel 33 on the lower output shaft 16 to implement the third gear (III). The driving gearwheel 25 on the inner input shaft 10 meshes with the driven gearwheel 35 on the upper output shaft 14 to implement the fifth gear (V). The driving gearwheel 22 on the outer input shaft 12 meshes with the driven gearwheel 32 on the upper output shaft 14 to implement the second gear (II). Finally, the driving gearwheel 24 on the outer input shaft 12 meshes both with the driven gearwheel 34 on the upper output shaft 14 to implement the fourth gear (IV), and with the driven gearwheel 36 on the lower output shaft 16 to implement the sixth gear (VI).

Given the free space that exists on the lower output shaft 16 between the driven gearwheel 33 and the engagement sleeve 46, it would be possible to mount on that shaft a further freely rotatable gear meshing with the driving gearwheel 25 on the inner input shaft 10 to implement a seventh gear. In that case, the engagement of the seventh gear would be controlled by the engagement sleeve 46 which, in the six-gear version, is associated solely with the sixth gear. As can be seen from FIG. 1, the addition of the seventh gear would not lead to an increase in the axial size of the gearbox.

Figure 2:
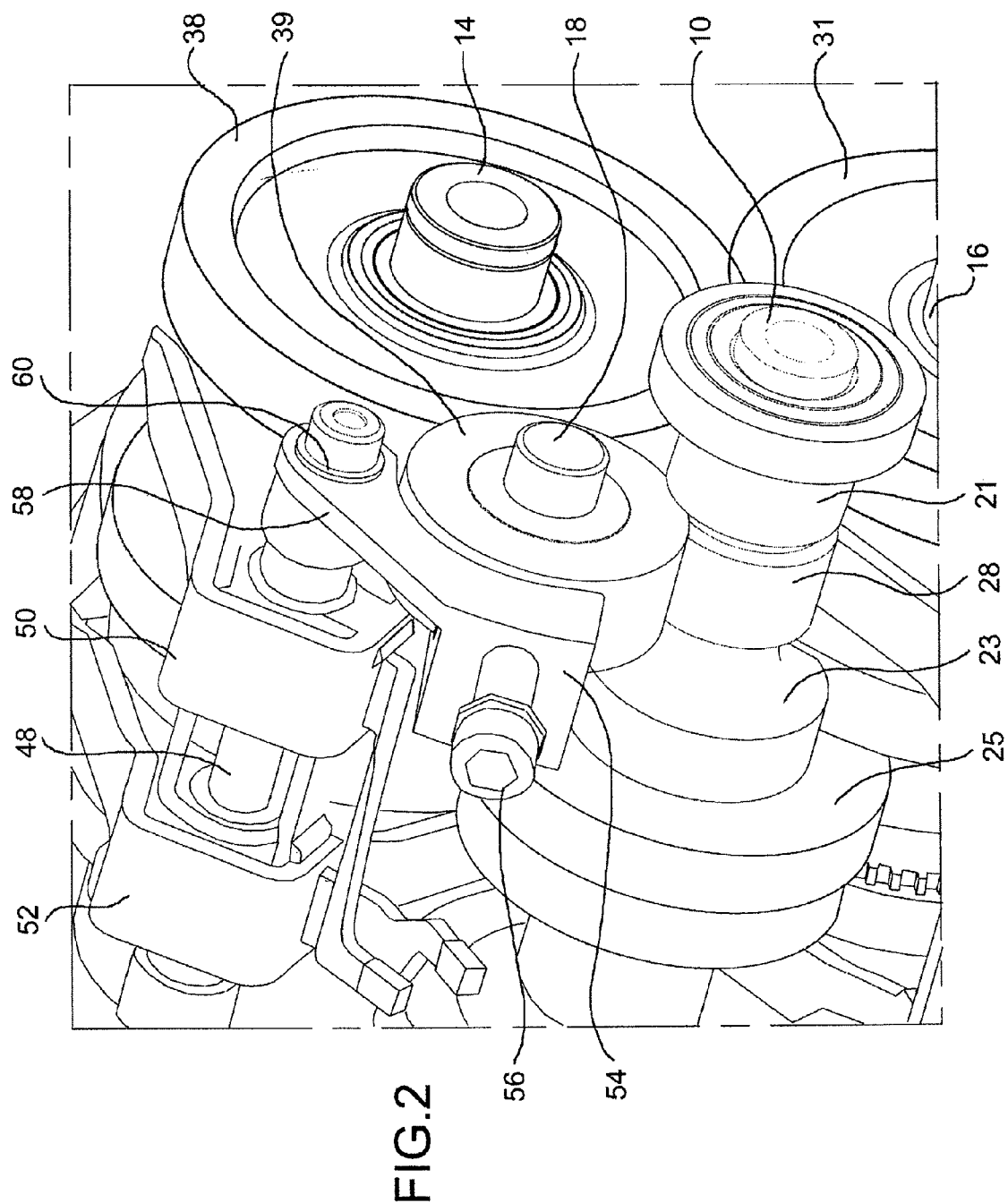
FIG. 2 is a perspective view which shows the end portion of the gearbox of FIG. 1 remote from the clutch unit.
Figure 3:
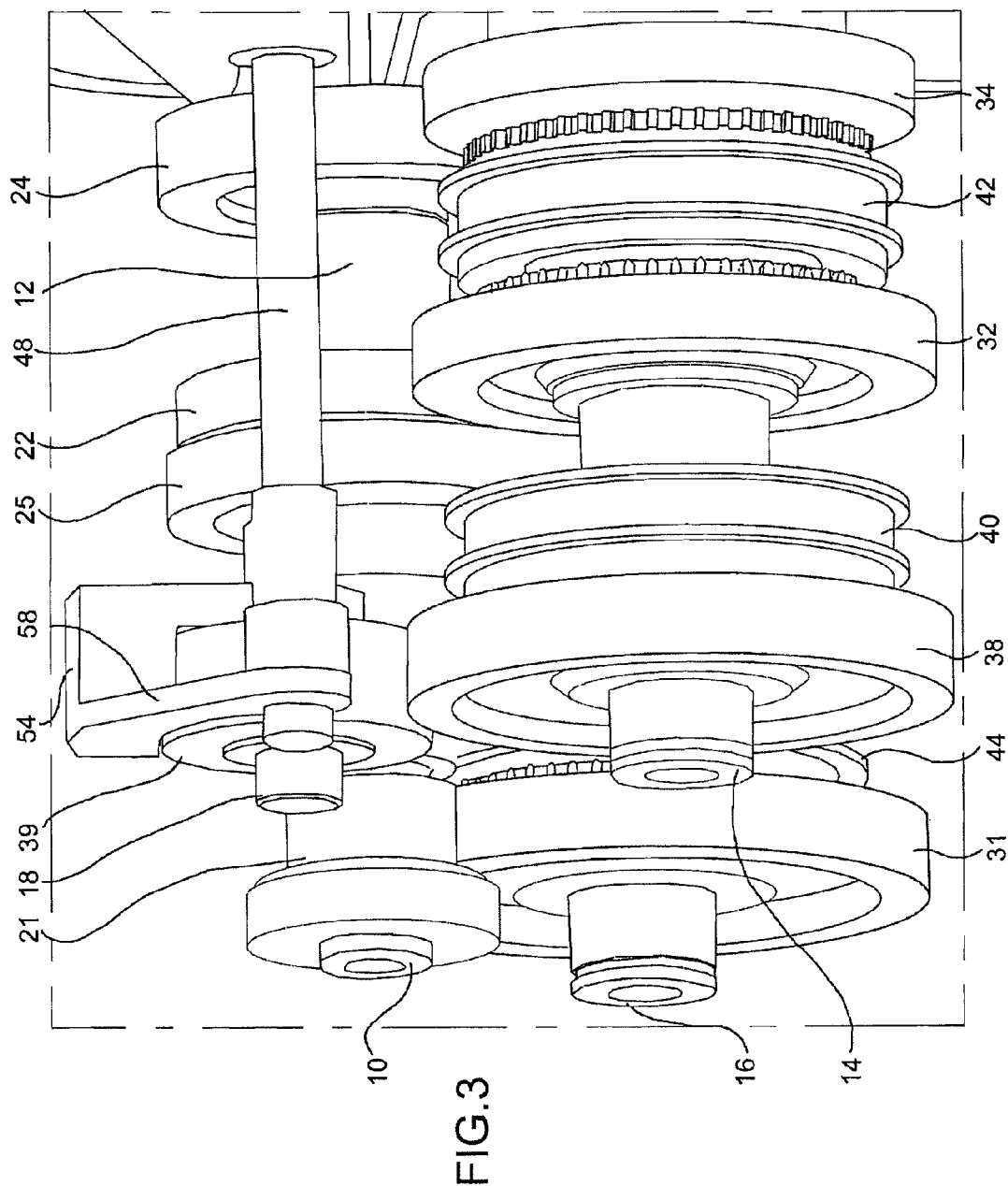
FIG. 3 is a view similar to that of FIG. 2 in which the shift forks have been removed from the gearbox, for simplicity.

The gearbox further comprises, in per-se-known manner, a pair of guide rods each associated with a respective output shaft. Two shift forks for operating each a respective engagement sleeve are mounted on each of the guide rods. In particular, a guide rod 48 associated with the upper output shaft 14 is shown in FIGS. 2 and 3. A first shift fork 50 for operating the first engagement sleeve 40 and a second shift fork 52 for operating the second engagement sleeve 42 are mounted on the guide rod 48.

With reference now also to FIG. 5 which shows, on an enlarged scale, a detail of FIG. 1 relating to the region of the gearbox in which the intermediate reverse-gear shaft 18 is mounted, that shaft is supported, at one end, in a special support seat 53 formed by the gearbox housing 19 and, at the opposite end, by a support bracket 54. The support bracket 54 is located and fixed to the housing 19 by means of a screw 56 and also forms an appendage 58 (FIGS. 2 and 3) having a locating hole 60 in which an end portion of the guide rod 48 remote from the clutch unit is fitted.

As can be seen from FIG. 1 in particular, by virtue of the particular arrangement of the gearwheels relating to the various gears, the gearbox according to the invention has a short upper output shaft, considerably shorter than the lower output shaft. This thus prevents problems of bulkiness in case of a forward, transverse arrangement of the gearbox.

A further advantage is that the reverse gear train uses a dedicated driving gearwheel, that is, a gear which is not shared with the gearwheel of another gear and straight gearwheels can therefore be used for that gear train. It is thus possible to prevent the transmission of axial forces and bending moments to the idle gearwheel mounted on the intermediate reverse-gear shaft.

Moreover, by virtue of the fact that the gear trains of the fourth and sixth gears, which share the same driving gearwheel, are arranged at the end of the gearbox facing the clutches, whereas the gear trains of the first and reverse gears are arranged at the axially opposite end, the above-described version of the gearbox, which is intended for a twin-clutch transmission, can easily be changed into a corresponding version for a single-clutch transmission, be it robotized or manual.

Figure 4:
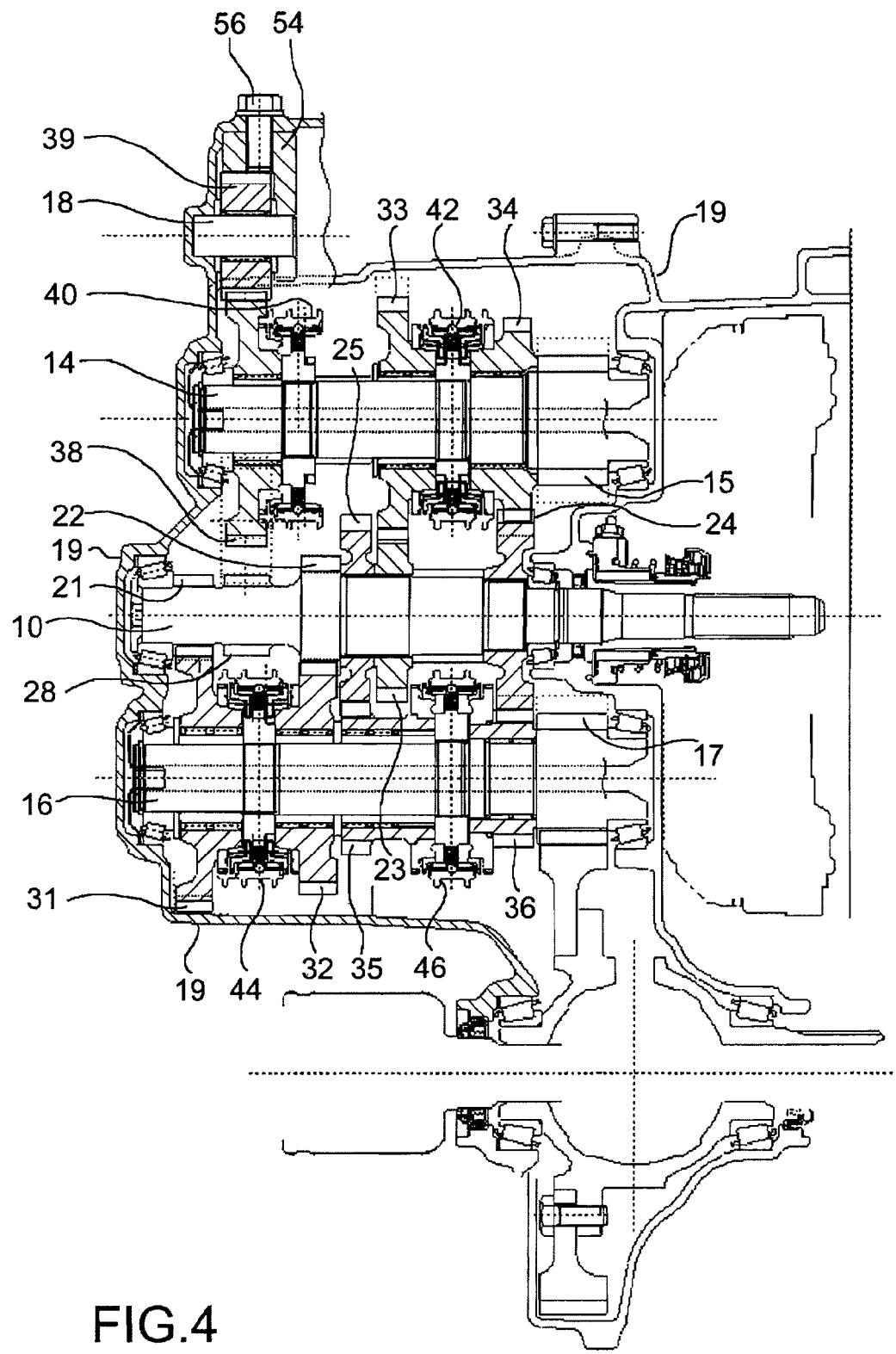
FIG. 4 is an axial section view through a six-gear gearbox for a single-clutch, manual motor-vehicle transmission which can be obtained from the gearbox of FIG. 1.

In this connection, a six-ratio gearbox for a manual, single-clutch motor-vehicle transmission that can be obtained from the gearbox shown in FIG. 1 will now be described with reference to FIG. 4. In FIG. 4, parts and elements that are identical or correspond to those of the six-ratio gearbox for a twin-clutch transmission of FIGS. 1 to 3 have been attributed the same reference numerals as were used in those drawings.

The gearbox of FIG. 4 comprises:
an input shaft 10 which can be coupled to a drive shaft (not shown) by means of a clutch (also not shown),
an upper output shaft 14 which is parallel to and disposed at a higher level than the input shaft 10,
a lower output shaft 16 which is parallel to and disposed at a lower level than the input shaft 10,
an intermediate reverse-gear shaft 18 parallel to the input shaft 10, and a housing 19 in which the input shaft 10 and the two output shafts 14, 16 are supported.

The input shaft 10 carries, in order from left to right as seen in FIG. 4, that is, towards the clutch, a driving gearwheel 21 for the first gear, a driving gearwheel 28 for the reverse gear, a driving gearwheel 22 for the second gear, a driving gearwheel 25 for the fifth gear, a driving gearwheel 23 for the third gear, and a driving gearwheel 24 for the fourth and sixth gears. The driving gearwheels 21, 22, 23, 24, 25 and 28 are drivingly connected for rotation with the input shaft 10 on which they are mounted and may be produced integrally with that shaft or formed as separate components from the shaft and fixed thereto by suitable mechanical fastening means.

The upper output shaft 14 carries, in order from left to right, a driven gearwheel 38 for the reverse gear, a driven gearwheel 33 for the third gear, a driven gearwheel 34 for the fourth gear, and a final reduction pinion 15. The lower output shaft 16 carries, in order from left to right, a driven gearwheel 31 for the first gear, a driven gearwheel 32 for the second gear, a driven gearwheel 35 for the fifth gear, a driven gearwheel 36 for the sixth gear, and a final reduction pinion 17.

The driven gearwheels 31, 32, 33, 34, 35, 36 and 38 are formed as freely rotatable gears and can be coupled selectively for rotation with the respective output shafts by means of sliding engagement sleeves 40, 42, 44 and 46. More specifically, a first engagement sleeve 40 is mounted on the upper output shaft 14 beside the driven gearwheel 38 for the reverse gear and is movable to the left to couple the gearwheel 38 for rotation with the output shaft 14. A second engagement sleeve 42 is mounted on the upper output shaft 14 between the driven gearwheels 33 and 34 for the third and fourth gears, respectively, and is movable selectively to the left or to the right to couple the gearwheel 33 or the gearwheel 34, respectively, for rotation with the output shaft 14. A third engagement sleeve 44 is mounted on the lower output shaft 16 between the driven gearwheels 31 and 32 for the first and second gears, respectively, and is movable selectively to the left or to the right in order to couple the gearwheel 31 or the gearwheel 32, respectively, for rotation with the output shaft 16. A fourth engagement sleeve 46 is mounted on the lower output shaft 16 between the driven gearwheels 35 and 36 for the fifth and sixth gears, respectively, and is movable selectively to the left or to the right in order to couple the gearwheel 35 or the gearwheel 36, respectively, for rotation with the output shaft 16.

The intermediate reverse-gear shaft 18 carries a freely-rotatable gearwheel 39 meshing with the driven reverse gearwheel 38 carried by the upper output shaft 14.

Proceeding in order from left to right, the driving gearwheel 21 on the input shaft 10 meshes with the driven gearwheel 31 on the lower output shaft 16 to implement the first gear (I). The driving gearwheel 28 on the input shaft 10 meshes with the freely rotatable gearwheel 39 on the intermediate reverse-gear shaft 18 and rotates the driven gearwheel 38 on the upper output shaft 14 by means of the gearwheel 39 to implement the reverse gear (R). The driving gearwheel 22 on the input shaft 10 meshes with the driven gearwheel 32 on the lower output shaft 16 to implement the second gear (II). The driving gearwheel 25 on the input shaft 10 meshes with the driven gearwheel 35 on the lower output shaft 16 to implement the fifth gear (V). The driving gearwheel 23 on the input shaft 10 meshes with the driven gearwheel 33 on the upper output shaft 14 to implement the third gear (III). Finally, the driving gearwheel 24 on the input shaft 10 meshes both with the driven gearwheel 34 on the upper output shaft 3 to implement the fourth gear (IV), and with the driven gearwheel 36 on the lower output shaft 16 to implement the sixth gear (VI).

With regard to the support of the intermediate reverse-gear shaft 18, the description given above with reference to the version of the gearbox for a twin-clutch transmission shown in FIGS. 1 to 3 applies.

As is clear from a comparison between FIGS. 1 and 4, the gearbox for a single-clutch, manual transmission shown in FIG. 4 can be obtained from the gearbox for a twin-clutch transmission shown in FIG. 1 by replacing the two input shafts 10, 12 with the single input shaft 10, exchanging the positions of the driving gearwheels 22 and 23 for the second and third gears, respectively, moving the driven gearwheel 32 for the second gear from the upper output shaft 14 to the lower output shaft 16, moving the driven gearwheel 33 for the third gear from the lower output shaft 16 to the upper output shaft 14, and moving the driven gearwheel 35 for the fifth gear from the upper output shaft 14 to the lower output shaft 16.

It is also possible to change from the gearbox for a twin-clutch transmission shown in FIG. 1 to a gearbox for a single-clutch robotized transmission (not shown), simply by replacing the two input shafts with a single input shaft but keeping the same arrangement of the gearwheels.

It will therefore be understood that the architecture proposed herein permits a high degree of synergy between the different versions of the gearbox and hence considerable savings in manufacturing costs.

Naturally, the principle of the invention remaining the same, the embodiments and details of construction may be varied widely with respect to those described and illustrated purely by way of non-limiting example.

What is claimed is:

1. A gearbox with six or more forward gears for a single-clutch or twin-clutch motor-vehicle transmission, comprising:
    at least one input shaft,
    a first output shaft which is parallel to and disposed at a higher level than the at least one input shaft,
    a second output shaft which is parallel to and disposed at a lower level than the at least one input shaft,
    a first driven gearwheel and a second driven gearwheel which are idly mounted on opposite ends of the first output shaft,
    a third driven gearwheel and a fourth driven gearwheel which are idly mounted on opposite ends of the second output shaft, and
    a first driving gearwheel and a second driving gearwheel which are drivingly connected for rotation with the at least one input shaft on opposite ends thereof, the first driving gearwheel meshing both with the first driven gearwheel and with the third driven gearwheel to implement a fourth gear and a sixth gear, respectively, and the second driving gearwheel meshing with the fourth driven gearwheel to implement a first gear,
    wherein the gearbox further comprises:
    an intermediate shaft parallel to the at least one input shaft,
    an intermediate gearwheel idly mounted on the intermediate shaft and meshing with the second driven gearwheel, and
    a third driving gearwheel which is drivingly connected for rotation with the at least one input shaft beside the second driving gearwheel on a side facing towards the first driving gearwheel, and which meshes with the intermediate gearwheel on the intermediate shaft to implement a reverse gear.

2. A gearbox according to claim 1, comprising a pair of coaxial input shafts, that is, an inner input shaft and an outer input shaft, of which the outer input shaft carries the first driving gearwheel and the inner input shaft carries the second and third driving gearwheels.

3. A gearbox according to claim 1, comprising a single input shaft carrying the first, second and third driving gearwheels.

4. A gearbox according to claim 2, wherein a fifth driven gearwheel and a sixth driven gearwheel are idly mounted on the first output shaft between the first and second driven gearwheels, wherein a seventh driven gearwheel is idly mounted on the second output shaft between the third and fourth driven gearwheels, wherein a fourth driving gearwheel and a fifth driving gearwheel are also drivingly connected for rotation with the inner input shaft and mesh, respectively, with the seventh driven gearwheel to implement a third gear and with the sixth driven gearwheel to implement a fifth gear, and wherein a sixth driving gearwheel is also drivingly connected for rotation with the outer input shaft and meshes with the fifth driven gearwheel to implement a second gear.

5. A gearbox according to claim 4, wherein an eighth driven gearwheel is idly mounted on the second output shaft between the third and seventh driven gearwheels and meshes with the fifth driving gearwheel to implement a seventh gear.

6. A gearbox according to claim 4, wherein a first engagement sleeve and a second engagement sleeve are also mounted on the first output shaft, the first engagement sleeve being interposed between the second and sixth driven gearwheels and being operable to couple either one of those gearwheels for rotation with that shaft, and the second engagement sleeve being interposed between the first and fifth driven gearwheels and being operable to couple either one of those gearwheels for rotation with that shaft, and wherein a third engagement sleeve and a fourth engagement sleeve are also mounted on the second output shaft, the third engagement sleeve being interposed between the fourth and seventh driven gearwheels and being operable to couple either one of those gearwheels for rotation with that shaft, and the fourth engagement sleeve being disposed beside the third driven gearwheel and being operable to couple that gearwheel for rotation with that shaft.

7. A gearbox according to claim 4, wherein an eighth driven gearwheel is idly mounted on the second output shaft between the third and seventh driven gearwheels and meshes with the fifth driving gearwheel to implement a seventh gear, wherein a first engagement sleeve and a second engagement sleeve are also mounted on the first output shaft, the first engagement sleeve being interposed between the second and sixth driven gearwheels and being operable to couple either one of those gearwheels for rotation with that shaft, and the second engagement sleeve being interposed between the first and fifth driven gearwheels and being operable to couple either one of those gearwheels for rotation with that shaft, and wherein a third engagement sleeve and a fourth engagement sleeve are also mounted on the second output shaft, the third engagement sleeve being interposed between the fourth and seventh driven gearwheels and being operable to couple either one of those gearwheels for rotation with that shaft, and the fourth engagement sleeve being disposed beside the third driven gearwheel and being operable to couple that gearwheel for rotation with that shaft.

8. A gearbox according to claim 7, wherein the fourth engagement sleeve is interposed between the third driven gearwheel and the eighth driven gearwheel and is operable to couple either one of those gearwheels for rotation with the second output shaft.

9. A gearbox according to claim 3, wherein a fifth driven gearwheel is idly mounted on the first output shaft between the first and second driven gearwheels, wherein a sixth driven gearwheel and a seventh driven gearwheel are idly mounted on the second output shaft, between the third and fourth driven gearwheels, and wherein a fourth driving gearwheel, a fifth driving gearwheel, and a sixth driving gearwheel are also drivingly connected for rotation with the input shaft, in order, between the first and third driving gearwheels, the fourth driving gear meshing with the fifth driven gearwheel to implement a third gear, the fifth driving gearwheel meshing with the sixth driven gearwheel to implement a fifth gear, and the sixth driving gearwheel meshing with the seventh driven gearwheel to implement a second gear.

10. A gearbox according to claim 9, wherein a first engagement sleeve and a second engagement sleeve are also mounted on the first output shaft, the first engagement sleeve being disposed beside the second driven gearwheel and being operable to couple that gearwheel for rotation with that shaft, and the second engagement sleeve being interposed between the first and fifth driven gearwheels and being operable to couple either one of those gearwheels for rotation with that shaft, and wherein a third engagement sleeve and a fourth engagement sleeve are also mounted on the second output shaft, the third engagement sleeve being interposed between the fourth and seventh driven gearwheels and being operable to couple either one of those gearwheels for rotation with that shaft, and the fourth engagement sleeve being interposed between the third and sixth driven gearwheels and being operable to couple either one of those gearwheels for rotation with that shaft.

11. A gearbox according to claim 1, wherein the third driving gearwheel, the second driven gearwheel and the intermediate gearwheel are straight gearwheels.

12. A gearbox according to claim 1, further comprising a housing in which the at least one input shaft, the first and second output shafts, and one end of the intermediate shaft are supported, and a bracket member which is fixed to the housing and supports the other end of the intermediate shaft, wherein the bracket member is a separate part from the housing.

13. A gearbox according to claim 12, further comprising a guide rod on which two shift forks are mounted slidably, wherein the bracket member also engages one end of the guide rod.

* * * * *